June 30, 1964    J. D. TURLAY    3,139,250
RESILIENT SUPPORT ASSEMBLY
Filed June 26, 1961
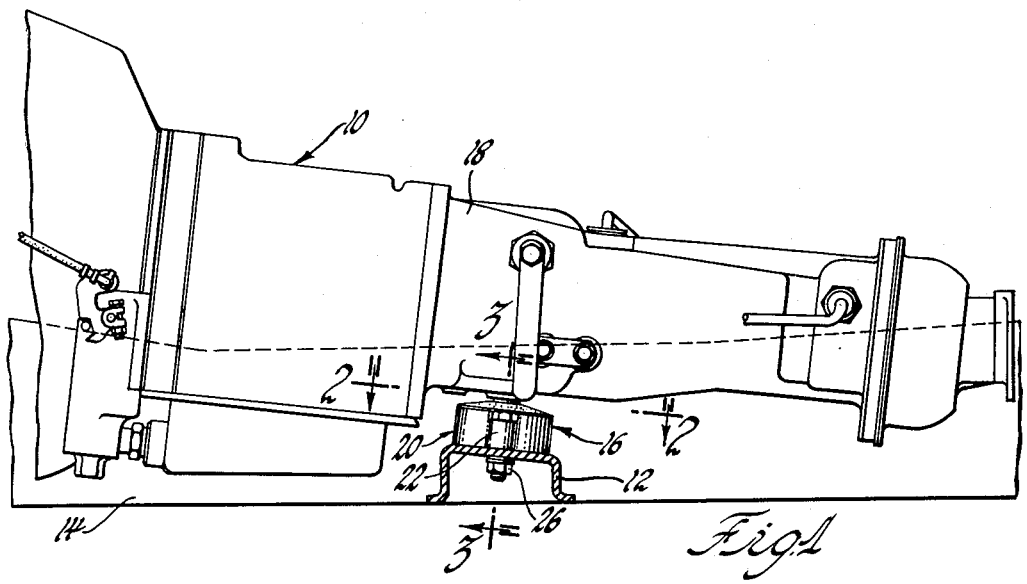
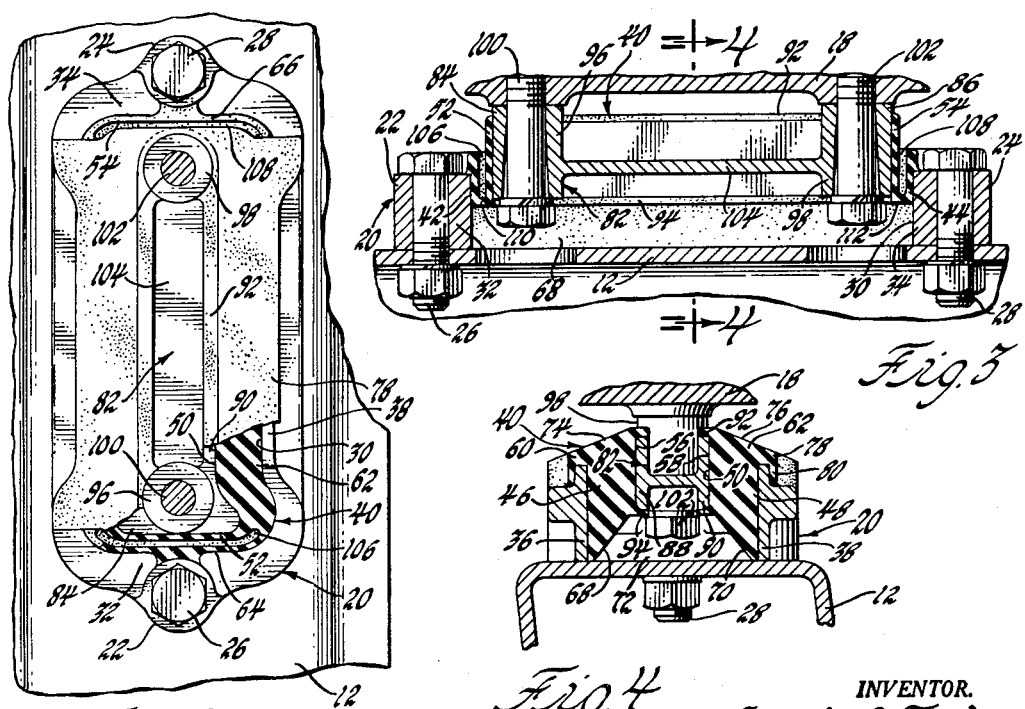
INVENTOR.
Joseph D. Turlay
BY
D. D. McGraw
ATTORNEY 3,139,250
RESILIENT SUPPORT ASSEMBLY
Joseph D. Turlay, Flint, Mich., assignor to General Motors Corporation, Detroit, Mich., a corporation of Delaware
Filed June 26, 1961, Ser. No. 119,469
2 Claims. (Cl. 248—10)

The invention relates to an assembly for resiliently supporting one member on another while permitting greater movement in opposite directions along one axis of movement than along other axes of movement. At the same time, it provides positive control of the amount of freedom in the directions of greater movement. Assemblies embodying the invention may be fabricated of cast and molded elements using light weight materials which contribute to the overall reduction in weight of mechanisms in which they are embodied.

In the drawing:

FIGURE 1 illustrates a support assembly embodying the invention when utilized as a vehicle transmission mount wherein the transmission is supported on a vehicle frame cross member;

FIGURE 2 is a plan view of the support assembly of FIGURE 1, taken in the direction of arrows 2—2 of that figure, and having parts broken away and in section;

FIGURE 3 is a sectional view of the support assembly of FIGURE 1, taken in the direction of arrows 3—3 of that figure, and having parts broken away; and FIGURE 4 is a sectional view of the support assembly, taken in the direction of arrows 4—4 of FIGURE 3, and having parts broken away.

The assembly embodying the invention is illustrated as providing a resilient support or mount for the vehicle transmission 10 on the frame cross member 12 extending between the frame side rails 14, one of which is illustrated. The mounting assembly 16 is attached to the lower side of the transmission housing 18 and the upper side of the cross member 12.

Mounting assembly 16 includes a base 20 which may be a casting and is provided with bosses 22 and 24 receiving bolt and nut assemblies 26 and 28 for fastening the base to the cross member 12. Base 20 is generally rectangular in conformation and is provided with an elongated recess 30 extending therethrough and defined by end walls 32 and 34 and side walls 36 and 38. The junctures between the end and side walls of recess 30 are preferably formed as large arcs to eliminate points of undue stress and to provide for enlarged ends receiving the resilient block member 40 in the recess. Resilient member 40 may be made of a suitable material, such as rubber, having desirable shear, compression and tension characteristics as is well known in the art. Member 40 is provided with outer end walls 42 and 44 and outer side walls 46 and 48 which are bonded or otherwise suitably secured to the end walls 32 and 34 and side walls 36 and 38 of base 20. Member 40 is also formed with a recess 50 generally similar in conformation to the base recess 30 and similarly provided with inner end walls 52 and 54 and inner side walls 56 and 58. The side sections 60 and 62 of member 40 are preferably substantially thicker than the ends 64 and 66 thereof. The sides 60 and 62 are preferably provided with angled lower surfaces 68 and 70 so that the lower edges of the member inner walls are in a plane above the plane of the lower edges of the member outer walls. This provides a space 72 beneath the recess 50 and intermediate the resilient member outer walls. The upper surfaces 74 and 76 of sides 60 and 62 are also angled so that the upper edges of the resilient member inner walls are in a plane above the plane passing through the upper edges of the resilient member outer walls. A lip 78 may extend circumferentially about the upper ends of the resilient member outer walls and have its lower surface bonded to the upper side of base 20. Lip 78 may also extend downwardly over a portion of the outer surface of base 20 as shown at 80.

A transmission mounting member 82 having a conformation similar to the recess 50 of member 40 is received in that recess and has its end walls 84 and 86 and side walls 88 and 90 bonded to the inner walls of recess 50. Upper and lower lips 92 and 94 formed at the upper and lower ends of the walls defining recess 50 may extend over the edges of member 82. Member 82 is provided with bosses 96 and 98 through which bolts 100 and 102 are received to secure member 82 to the bottom of the transmission housing 18. Member 82 may also be provided with a centrally disposed web 104 extending between the walls thereof and the bosses 96 and 98. The end walls 84 and 86 of member 82 are preferably flat and, in the assembled position of the mounting unit, are generally parallel to the inner end walls 32 and 34 of base 20 and extend downwardly within recess 36 of the base so that movement of member 82 relative to base 20 will result in engagement of these walls, with portions of resilient member 40 therebetween, to positively limit the amount of allowed endwise movement.

In order to restrict lateral movement of transmission 10 relative to cross member 12 without affecting the vertical rate of the mounting, member 40 is provided with pockets 106 and 108 in each end thereof respectively intermediate the end walls 42, 52 and 44, 54. The pockets are open at one end and provided with closed base webs 110 and 112. The pockets extend substantially along the entire length of the end walls of resilient member 40 as is best seen in FIGURE 2. Movement of member 82 relative to base 20 results in collapse of these pockets. As the pockets become fully collapsed, member 82 is prevented from further lateral movement by the inner end wall 32 or 34 to positively limit the extent of lateral movement. The sizes of the pockets may be modified in the manufacturing process by changing the space between the adjacent walls through control of wall thickness to vary the lateral control of member 82 relative to base 20 to suit the requirements.

The angled construction of resilient member 40, as best illustrated in FIGURE 4, provides a low vertical rate mounting by virtue of the shear loading of the resilient material. Vertical movement of the transmission relative to the cross member is taken up in shear of side walls 46 and 48.

I claim:
1. In a dual axis resilient support assembly having a greater spring rate along the vertical than along the lateral axis, a base member having an aperture therethrough defined by inner end and side walls, a resilient member received in said base member aperture and having outer end and side walls secured to said base member inner end and side walls and an aperture therethrough defined by inner end and side walls and an end pocket formed in each end thereof intermediate said resilient member inner and outer end walls, an insert received in said resilient member aperture and having outer end and side walls secured to said resilient member inner end and side walls, said resilient member inner and outer side walls partially overlapping each other in an axial direction and being connected by sloping top and bottom surfaces, and securing means for securing said base member to a support and said insert to an element to be supported, said resilient member pockets being deformable and permitting endwise movement of said insert relative to said base member, said resilient member side walls being thicker than the end walls and responsive in shear to vertical displacement of said insert relative to said base member permitting greater movement in a vertical direction than the lateral movement permitted by said end walls due to deformation of said pockets.

2. In a dual axis resilient mount for mounting a vehicle transmission to a cross-frame member and having a greater spring rate along the vertical than along the lateral axis, a base having an elongated recess formed therein, a resilient member received in said base recess and secured at the opposite side walls thereof and having an elongated recess therein complementing said base recess, a mounting insert received in said resilient member recess and secured to the opposite side walls thereof in axial offset relationship with said base recess side walls, and means for securing said base to said vehicle cross-frame member and said insert to said transmission, said resilient member having at least one collapsible pocket formed in each of the opposite end walls that is deformable under lateral movement of said insert relative to said base, said resilient member side walls being thicker than the end walls and responsive in shear to vertical displacement of said insert relative to said base permitting greater movement in a vertical direction than the lateral movement permitted by said end walls due to the deformation of said pockets.

References Cited in the file of this patent
UNITED STATES PATENTS

| | | |
|---|---|---|
| 2,138,175 | Keys | Nov. 29, 1938 |
| 2,332,264 | Saurer | Oct. 19, 1943 |
| 2,621,876 | Else | Dec. 16, 1952 |